United States Patent
Hirai et al.

(10) Patent No.: US 9,212,597 B2
(45) Date of Patent: Dec. 15, 2015

(54) COOLANT COMPOSITION FOR INTERNAL COMBUSTION ENGINE AND METHOD FOR OPERATING INTERNAL COMBUSTION ENGINE

(75) Inventors: Takuya Hirai, Susono (JP); Yuichi Shimasaki, Mishima (JP); Rentaro Kuroki, Susono (JP); Syou Tomita, Susono (JP); Minoru Yamashita, Okazaki (JP); Kazuhiro Miyajima, Okazaki (JP); Keiji Hayashi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 32 days.

(21) Appl. No.: 14/369,394

(22) PCT Filed: Jun. 8, 2012

(86) PCT No.: PCT/JP2012/064773
§ 371 (c)(1),
(2), (4) Date: Jun. 27, 2014

(87) PCT Pub. No.: WO2013/183161
PCT Pub. Date: Dec. 12, 2013

(65) Prior Publication Data
US 2015/0211407 A1  Jul. 30, 2015

(51) Int. Cl.
| F02B 43/00 | (2006.01) |
| F01P 3/00 | (2006.01) |
| C09K 5/10 | (2006.01) |
| F01P 11/16 | (2006.01) |
| C09K 5/06 | (2006.01) |

(52) U.S. Cl.
CPC . *F01P 3/00* (2013.01); *C09K 5/066* (2013.01); *C09K 5/10* (2013.01); *F01P 11/16* (2013.01); *F01P 2003/001* (2013.01)

(58) Field of Classification Search
CPC ............ C10M 107/24; C10M 169/04; C10M 107/34; C10M 171/008; C10M 2203/1065; C10M 2205/0285; C10M 2207/04; C10M 2209/103; C10M 2209/1033; C10M 2209/1045; C10M 2209/108; C10N 2240/10; F01P 11/16; F01P 2003/001; F01P 3/00
USPC .......... 123/1 A, 1 R; 508/110, 113, 370, 511, 508/564; 252/70, 71, 72, 73
See application file for complete search history.

(56) References Cited

U.S. PATENT DOCUMENTS

| 4,528,108 | A | * | 7/1985 | Grover | C10M 167/00 123/41.42 |
| 4,755,316 | A | * | 7/1988 | Magid | C09K 5/045 252/67 |
| 5,096,606 | A | * | 3/1992 | Hagihara | C09K 5/045 252/67 |
| 5,202,036 | A | * | 4/1993 | Ripple | C10M 159/20 508/189 |
| 5,498,355 | A | * | 3/1996 | Perozzi | C10M 133/56 508/194 |
| 5,736,915 | A | * | 4/1998 | Goedde | H01F 27/14 336/55 |
| 6,485,659 | B1 | * | 11/2002 | Goedde | H01F 27/12 174/17 LF |
| 2006/0163529 | A1 | * | 7/2006 | Jokinen | C09K 5/10 252/73 |
| 2010/0075875 | A1 | * | 3/2010 | Yaguchi | C10M 169/04 508/192 |
| 2010/0234256 | A1 | * | 9/2010 | Sato | C09K 5/045 508/463 |
| 2012/0012076 | A1 | * | 1/2012 | Atkinson | C10M 169/04 123/1 A |
| 2012/0258898 | A1 | * | 10/2012 | Takeshima | C10M 143/10 508/370 |

FOREIGN PATENT DOCUMENTS

| JP | 08 183950 | 7/1996 |
| JP | 09 227859 | 9/1997 |
| JP | 2006-316670 A | 11/2006 |
| JP | 2007-239697 A | 9/2007 |
| JP | 2008-45090 A | 2/2008 |
| JP | 2010 236064 | 10/2010 |
| JP | 2011 121991 | 6/2011 |
| JP | 2011 132285 | 7/2011 |
| JP | 2011 137089 | 7/2011 |

OTHER PUBLICATIONS

International Search Report Issued Sep. 11, 2012 in PCT/JP12/064773 filed Jun. 8, 2012.

* cited by examiner

*Primary Examiner* — Lindsay Low
*Assistant Examiner* — Long T Tran
(74) *Attorney, Agent, or Firm* — Oblon, McClelland, Maier & Neustadt, L.L.P.

(57) ABSTRACT

This invention provides a coolant composition for an internal combustion engine that can improve the energy efficiency of an internal combustion engine and a method for operating an internal combustion engine using such coolant composition. The coolant composition for an internal combustion engine of the invention has kinematic viscosity of 8.5 to 3,000 mm$^2$/sec at 25° C. and 0.3 to 1.3 mm$^2$/sec at 100° C. The method for operating an internal combustion engine of the invention is carried out with the use of such composition.

12 Claims, 2 Drawing Sheets

COOLANT COMPOSITION FOR INTERNAL COMBUSTION ENGINE AND METHOD FOR OPERATING INTERNAL COMBUSTION ENGINE

TECHNICAL FIELD

The present invention relates to a coolant composition for an internal combustion engine that can improve the energy efficiency of an internal combustion engine and a method for operating an internal combustion engine using such coolant composition.

BACKGROUND ART

While various types of liquids are known as coolants used for cooling of automobile engines or the like, water is particularly preferable because of its cooling performance as an engine coolant, which is the highest among various types of liquids. However, fresh water freezes at 0° C., and its volume increases. Accordingly, fresh water may cause damage to engines or radiators. Under such circumstances, a coolant composition that was prepared by diluting a glycol base such as ethylene glycol with water so as to achieve a non-freezing temperature, optionally comprising various additives for protection against deterioration of metal, rubber, resin, or other materials used for engines or radiators has been used. In contrast, a coolant composition comprising water and various additives is occasionally used in areas in which there is no risk of freezing.

When a glycol such as ethylene glycol is used, disadvantageously, the viscosity of a coolant composition is significantly increased, particularly at low temperatures. In conventional techniques intended for improvement in viscosity characteristics, in general, viscosity reduction had been attempted in order to enhance fluidity at low temperatures (Patent Documents 1 to 3).

When viscosity reduction is attempted, however, the thickness of the boundary between the coolant and the bore wall is reduced, and convection is likely to take place. Thus, a coolant can easily conduct heat away from the bore wall, and cooling loss is increased as a consequence, which raises the new problem of decreasing energy efficiency. When a glycol such as ethylene glycol is concentrated to increase the viscosity of the coolant at low temperatures with the intention of lowering the heat release rate and reducing the cooling loss, however, cooling performance at high temperatures becomes insufficient, which disadvantageously causes overheating.

For example, Patent Documents 4 to 6 each describe a technique for improving viscosity characteristics of a lubricating oil by incorporating an agent for improving the viscosity index. However, such agent is incorporated with the intention of suppressing the decrease in viscosity at high temperatures and maintaining fluidity at low temperatures. With the use of a coolant comprising such agent, accordingly, it is not possible to reduce cooling loss at low temperatures and simultaneously maintain cooling performance at high temperatures.

PRIOR ART DOCUMENTS

Patent Documents

Patent Document 1: JP H08-183950 A (1996)
Patent Document 2: JP 2010-236064 A
Patent Document 3: JP H09-227859 A (1997)
Patent Document 4: JP 2011-137089 A
Patent Document 5: JP 2011-132285 A
Patent Document 6: JP 2011-121991 A

SUMMARY OF THE INVENTION

Object to be Attained by the Invention

The present invention provides a coolant composition for an internal combustion engine that can improve the energy efficiency of an internal combustion engine and a method for operating an internal combustion engine using such coolant composition. More particularly, the present invention provides a coolant composition that can reduce cooling loss at low temperatures and simultaneously maintain cooling performance at high temperatures, and a method for operating an internal combustion engine using such coolant composition.

Means for Attaining the Object

The present inventors discovered that cooling loss at low temperatures could be reduced and cooling performance at high temperatures could be maintained by adjusting the kinematic viscosity of a coolant composition within a particular range, and the energy efficiency of an internal combustion engine could be remarkably improved as a consequence.

Specifically, the present invention includes the following.

(1) A method for operating an internal combustion engine involving the use of a coolant composition having kinematic viscosity of 8.5 to 3,000 mm$^2$/sec at 25° C. and 0.3 to 1.3 mm$^2$/sec at 100° C. as a coolant for an internal combustion engine.

(2) The method according to (1), wherein the coolant composition comprises, as a base, at least one type of alcohol selected from the group consisting of dihydric alcohol, trihydric alcohol, and glycol monoalkyl ether and/or water.

(3) The method according to (1) or (2), wherein the coolant composition comprises an agent for improving viscosity characteristics.

(4) The method according to (3), wherein the agent for improving viscosity characteristics is a phase-change material.

(5) A coolant composition for an internal combustion engine having kinematic viscosity of 8.5 to 3,000 mm$^2$/sec at 25° C. and 0.3 to 1.3 mm$^2$/sec at 100° C.

(6) The composition according to (5), which comprises, as a base, at least one type of alcohol selected from the group consisting of dihydric alcohol, trihydric alcohol, and glycol monoalkyl ether and/or water.

(7) The composition according to (5) or (6), which comprises an agent for improving viscosity characteristics.

(8) The composition according to (7), wherein the agent for improving viscosity characteristics is a phase-change material.

Effects of the Invention

The present invention can provide a coolant composition for an internal combustion engine that can improve the energy efficiency of an internal combustion engine and a method for operating an internal combustion engine using such coolant composition.

EMBODIMENTS FOR CARRYING OUT THE INVENTION

Figure 1:
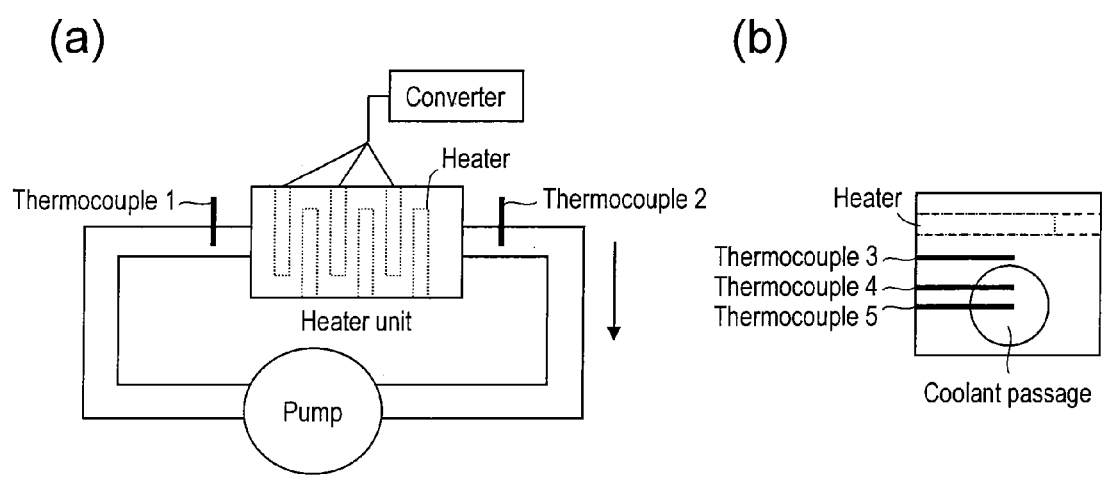
FIG. 1 shows a principle of an apparatus for warming performance evaluation used in the examples.

The coolant composition of the present invention has kinematic viscosity of 8.5 to 3,000 mm$^2$/sec at 25° C. and 0.3 to 1.3 mm$^2$/sec at 100° C. In the present invention, the term "low temperature" refers to 25° C. and the term "high temperature" refers to 100° C.

The coolant composition of the present invention has high kinematic viscosity at 25° C., which is 8.5 to 3,000 mm$^2$/sec, preferably 10 to 2,200 mm$^2$/sec, and more preferably 17.5 to 1,000 mm$^2$/sec. Thus, the amount of heat released at low temperatures is small, and the cooling loss remains small. Since the kinematic viscosity of the coolant composition of the present invention is 3,000 mm$^2$/sec or lower at 25° C., the load of a water pump can be reduced, which, in turn, leads to maintenance of the energy efficiency of the internal combustion engine. Also, the kinematic viscosity of the coolant composition of the present invention is 8.5 mm$^2$/sec or higher at 25° C., which is higher than that of a conventional coolant comprising 80% ethylene glycol. When ethylene glycol concentration is over 80% in an ethylene glycol coolant, such coolant cannot be used for its intended purpose because ethylene glycol has its flash point.

The coolant composition of the present invention has low kinematic viscosity at 100° C., which is 0.3 to 1.3 mm$^2$/sec, and preferably 0.5 to 0.9 mm$^2$/sec. Thus, cooling performance can be maintained at high temperatures, and overheating can be prevented from occurring. Cooling performance of the coolant composition can be evaluated by measuring the heat transmission rate of the radiator. The kinematic viscosity of a coolant consisting of 100% water is 0.3 mm$^2$/sec at 100° C.

It is preferable that the coolant composition of the present invention comprise an antifreeze base. The amount of the base to be incorporated is preferably 86 to 98.6 parts by mass, and particularly preferably 91 to 96.7 parts by mass, relative to 100 parts by mass of the composition.

For example, such base can be at least one type of alcohol selected from the group consisting of dihydric alcohol, trihydric alcohol, and glycol monoalkyl ether.

Examples of dihydric alcohol include at least one member selected from among ethylene glycol, diethylene glycol, triethylene glycol, propylene glycol, 1,3-propanediol, 1,4-butanediol, 1,3-butanediol, 1,5-pentanediol, and hexylene glycol, and a mixture of two or more of them.

Examples of trihydric alcohol include at least one member selected from among glycerin, trimethylolethane, trimethylolpropane, 5-methyl-1,2,4-heptanetriol, and 1,2,6-hexanetriol, and a mixture of two or more of them.

Examples of glycol monoalkyl ether include at least one member selected from among ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether, and a mixture of two or more of them.

Among the bases mentioned above, ethylene glycol, propylene glycol, and 1,3-propanediol are particularly preferable from the viewpoint of ease of handling, cost, and availability.

In view of antifreeze properties, the amount of the aforementioned alcohol to be incorporated is preferably 8.6 to 78.88 parts by mass, and particularly preferably 21.5 to 78.88 parts by mass, relative to 100 parts by mass of the composition.

A base may contain water, and water is preferably ion-exchange water. The amount of water to be incorporated is preferably 17.2 to 88.74 parts by mass, and particularly preferably 17.2 to 73.95 parts by mass, relative to 100 parts by mass of the composition. When a base contains water and an alcohol, the proportion of water to the alcohol in a base is preferably 20:80 to 90:10, and particularly preferably 40:60 to 75:25, in order to prevent the alcohol from having its flash point. When antifreeze properties are not necessary, a base may consist of water.

It is preferable that the coolant composition of the present invention comprise a substance capable of increasing kinematic viscosity at low temperatures and decreasing kinematic viscosity at high temperatures; that is, an agent for improving viscosity characteristics. Kinematic viscosity at 25° C. and that at 100° C. may be adjusted within the range described above with the use of an agent for improving viscosity characteristics, so that cooling loss at low temperatures can be reduced and cooling performance at high temperatures can be maintained.

The agent for improving viscosity characteristics is not particularly limited, provided that such agent is capable of adjusting the kinematic viscosity of the coolant composition within the range described above.

As the agent for improving viscosity characteristics, a phase-change material, for example, can be used, and use of a phase-change material that undergoes a phase change at 60° C. to 100° C. is preferable. An example of such phase-change material is a salt of carboxylic acid having a melting point of 40° C. to 80° C. in the form of a free carboxylic acid, such as a salt of aliphatic carboxylic acid having 14 to 18 carbon atoms, with the degree of solubility thereof in an alcohol used as the base being 5% by mass or lower at 25° C. and 10% by mass or higher at 100° C. Specific examples include sodium stearate, potassium stearate, sodium palmitate, and potassium palmitate, with sodium stearate and potassium stearate being preferable. Such phase-change material is solidified and turned into slurry at low temperatures, and the kinematic viscosity of the coolant can be increased. In addition, such phase-change material is turned into a solution at high temperatures, and the kinematic viscosity of the coolant can be decreased.

A thermoplastic substance can be used as the agent for improving viscosity characteristics. For example, a substance that can aggregate at around 25° C. and disaggregate at around 100° C. can be used. Aggregation takes place via, for example, intermolecular hydrogen bonds, hydrophobic interactions (polymers, in particular), and π-stacking between aromatic organic molecules. The same or different molecules may be aggregated to each other. Such substance behaves as a macromolecule at low temperatures, so as to increase the kinematic viscosity of a coolant. Further, such substance behaves as a single molecule at high temperatures, so as to decrease the kinematic viscosity of a coolant.

The amount of the agent for improving viscosity characteristics to be incorporated is not particularly limited, provided that the kinematic viscosity of the coolant composition can be adjusted within the range of low temperatures and the range of high temperatures mentioned above, respectively. Such amount is preferably 1.3 to 4.0 parts by mass, and particularly preferably 2.0 to 3.0 parts by mass, relative to 100 parts by mass of the composition. The coolant composition of the present invention can involve the use of the above agents for improving viscosity characteristics in combination.

The coolant composition of the present invention can optionally comprise other additives incorporated into a base, in addition to the agent for improving viscosity characteristics, provided that the effects of the present invention are not adversely affected.

For example, the coolant composition of the present invention can comprise at least one corrosion inhibitor in an amount that does not affect kinematic viscosity, in order to effectively suppress corrosion of metals used in an automobile engine cooling circuit. Examples of corrosion inhibitors include one of phosphoric acid and/or salts thereof, aromatic carboxylic acid and/or salts thereof, triazoles, thiazoles, silicate salt, nitrate salt, nitrite salt, borate salt, molybdate salt, and amine salt, and a mixture of two or more of them.

Also, the coolant composition of the present invention can adequately comprise a pH adjuster, such as sodium hydroxide or potassium hydroxide, an antifoaming agent, or a coloring agent, in an amount that does not affect the kinematic viscosity.

The total amount of such other additives to be mixed is generally 10 parts by mass or less, and preferably 5 parts by mass or less, relative to 100 parts by mass of the composition.

Hereafter, the present invention is described with reference to the examples, although the technical scope of the present invention is not limited to the examples.

EXAMPLES

Example 1

Ethylene glycol (45.5 parts by mass) was mixed with 50 parts by mass of water, and 2 parts by mass of a corrosion inhibitor; i.e., 1 part by mass of phosphoric acid in combination with 1 part by mass of benzotriazole, was added thereto, followed by mixing. After 2.5 parts by mass of sodium stearate had been added to the resulting mixture, the mixture was heated to 80° C., agitated for 30 minutes, and then allowed to stand in such state. Thus, a coolant composition was obtained.

Example 2

A coolant composition was obtained in the same manner as in Example 1, except that the amount of ethylene glycol used was changed from 45.5 parts by mass to 46.5 parts by mass and the amount of sodium stearate used was changed from 2.5 parts by mass to 1.5 parts by mass.

Example 3

A coolant composition was obtained in the same manner as in Example 1, except that the amount of ethylene glycol used was changed from 45.5 parts by mass to 46 parts by mass and the amount of sodium stearate used was changed from 2.5 parts by mass to 2 parts by mass.

Example 4

A coolant composition was obtained in the same manner as in Example 1, except that ethylene glycol was not used, the amount of water used was changed from 50 parts by mass to 92 parts by mass, and the amount of sodium stearate used was changed from 2.5 parts by mass to 2 parts by mass.

Comparative Example 1

A coolant composition was obtained in the same manner as in Example 1, except that the amount of ethylene glycol used was changed from 45.5 parts by mass to 48 parts by mass and sodium stearate was not used. The coolant composition of Comparative Example 1 is equivalent to a conventional coolant comprising 50% ethylene glycol, which exhibits high cooling performance.

Comparative Example 2

A coolant composition was obtained in the same manner as in Example 1, except that the amount of ethylene glycol used was changed from 45.5 parts by mass to 58 parts by mass, the amount of water used was changed from 50 parts by mass to 40 parts by mass, and sodium stearate was not used. The coolant composition of Comparative Example 2 is equivalent to a conventional coolant comprising 60% ethylene glycol, which exhibits high cooling performance.

Comparative Example 3

A coolant composition was obtained in the same manner as in Example 1, except that the amount of ethylene glycol used was changed from 45.5 parts by mass to 80 parts by mass, the amount of water used was changed from 50 parts by mass to 18 parts by mass, and sodium stearate was not used. The coolant composition of Comparative Example 3 is equivalent to a conventional coolant comprising 80% ethylene glycol that has improved warming performance and the maximal ethylene glycol concentration at which ethylene glycol does not have its flash point.

Comparative Example 4

A coolant composition was obtained in the same manner as in Example 1, except that the amount of water used was changed from 50 parts by mass to 47.5 parts by mass and the amount of sodium stearate used was changed from 2.5 parts by mass to 5 parts by mass.

Comparative Example 5

A coolant composition was obtained in the same manner as in Example 1, except that the amount of ethylene glycol used was changed from 45.5 parts by mass to 47 parts by mass and the amount of sodium stearate used was changed from 2.5 parts by mass to 1 part by mass.

The coolant compositions obtained in Examples 1 to 4 and Comparative Examples 1 to 5 were subjected to measurement of kinematic viscosity at 25° C. and at 100° C., and thermal properties (i.e., warming performance and cooling performance) thereof were evaluated.

<Measurement of Kinematic Viscosity>

The coolant compositions were subjected to measurement of kinematic viscosity at 25° C. and at 100° C. in accordance with the method involving the use of glass capillary kinematic viscometers according to JIS K 2283 or ASTM D445/D446. Specifically, measurement was carried out in the manner described below.

(1) An Uberode-type viscometer in accordance with JIS K 2283 was prepared, and the defined amount of the sample was introduced therein by tilting the viscometer to prevent foam from entering thereinto.

(2) The temperature of the viscometer filled with the sample was controlled in a constant-temperature water tank for 15 minutes.

(3) After the sample had been sucked up above the upper marked line, it was allowed to freely fall down, and the duration required for the meniscus to fall from the upper marked line to the lower marked line was measured.

(4) The procedures (1) to (3) above were performed with the use of a different viscometer when the duration of measurement was less than 200 seconds.

(5) Measurement was carried out twice with the use of a viscometer requiring a duration of measurement of 200 seconds or longer. When the duration of measurement differed by 0.2% or less from the average, the kinematic viscosity was determined based on the average duration of measurement and the viscometer constant for the viscometer used.

<Warming Performance>

Warming performance was evaluated using an apparatus for warming performance evaluation as shown in FIG. 1 (see FIG. 1a).

A pump motor was immobilized, and the duration required for the temperature of thermocouple 3 (see FIG. 1b) of the heating unit to rise from 25° C. to 60° C. was measured. The result for the conventional coolant composition of Comparative Example 3 (i.e., 40 seconds, which is a conventional coolant composition having improved warming performance and the maximal ethylene glycol concentration at which ethylene glycol would not have its flash point) was designated as the reference duration. Warming performance was evaluated as being high when the duration of the reaction was shorter than the reference duration.

<Cooling Performance>

Figure 2:
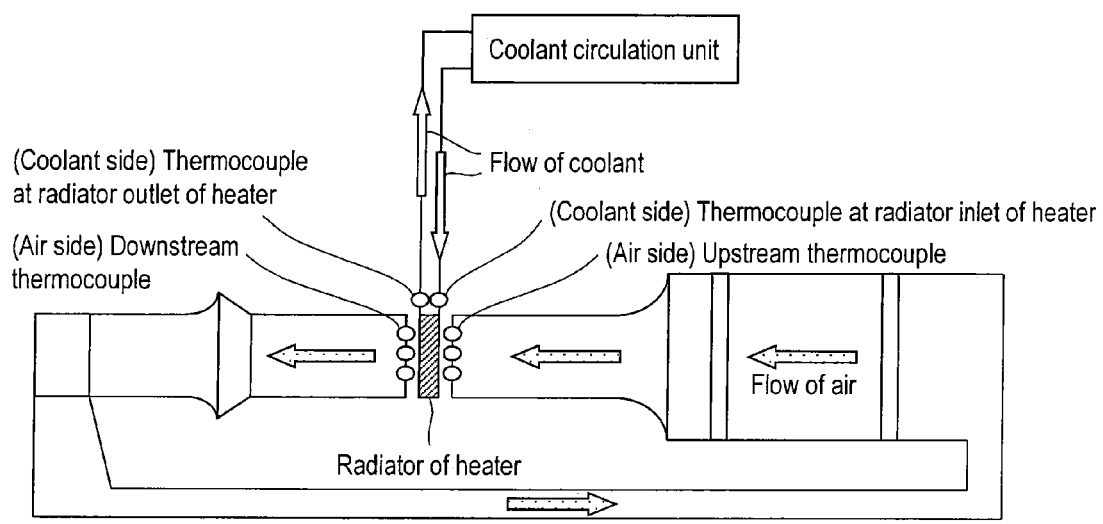
FIG. 2 shows a principle of an apparatus for cooling performance evaluation used in the examples.

Cooling performance was measured with the use of an apparatus for cooling performance evaluation as shown in FIG. 2.

A pump motor was immobilized, the pressure level was increased to 20 kPa or higher, and the amount of energy received by the air when the temperature of each coolant composition was 100° C. was measured. As the amount of energy received by the air was increased, cooling performance was also enhanced. When the amounts of energy received by the air were equivalent to the results attained in Comparative Examples 1 and 2 for the conventional coolant compositions exhibiting high cooling performance; that is, when such amounts were each 14.2 to 14.7 kW, the relevant coolant compositions were evaluated to have maintained their cooling performance.

The results of measurements of kinematic viscosity, warming performance, and cooling performance for the coolant compositions obtained in Examples 1 to 4 and Comparative Examples 1 to 5 are shown in Table 1.

warming performance and the maximal ethylene glycol concentration at which ethylene glycol does not have its flash point. Accordingly, the coolant compositions of Examples 1 to 4 are superior to the conventional coolant composition of Comparative Example 3 in terms of warming performance.

Also, the coolant compositions of Examples 1 to 3 show amounts of energy received by the air that were equivalent to those of conventional coolant compositions of Comparative Examples 1 and 2 exhibiting high cooling performance. That is, the coolant compositions of Examples 1 to 3 were found to have maintained their cooling performance.

INDUSTRIAL APPLICABILITY

The coolant composition of the present invention is preferably used for cooling of an internal combustion engine, and, in particular, an automobile engine.

All publications, patents, and patent applications cited herein are incorporated herein by reference in their entirety.

The invention claimed is:

1. A method for operating an internal combustion engine involving the use of a coolant composition having kinematic viscosity of 8.5 to 3,000 mm$^2$/sec at 25° C. and 0.3 to 1.3 mm$^2$/sec at 100° C. as a coolant for an internal combustion engine.

2. The method according to claim 1, wherein the coolant composition comprises, as a base, at least one type of alcohol selected from the group consisting of dihydric alcohol, trihydric alcohol, and glycol monoalkyl ether and/or water.

3. The method according to claim 2, wherein the coolant composition comprises an agent for improving viscosity characteristics.

4. The method according to claim 3, wherein the agent for improving viscosity characteristics is a phase-change material.

5. The method according to claim 1, wherein the coolant composition comprises an agent for improving viscosity characteristics.

6. The method according to claim 5, wherein the agent for improving viscosity characteristics is a phase-change material.

7. A coolant composition for an internal combustion engine having kinematic viscosity of 8.5 to 3,000 mm$^2$/sec at 25° C. and 0.3 to 1.3 mm$^2$/sec at 100° C.

TABLE 1

|  |  | Examples | | | | Comparative Examples | | | | |
| --- | --- | --- | --- | --- | --- | --- | --- | --- | --- | --- |
|  |  | 1 | 2 | 3 | 4 | 1 | 2 | 3 | 4 | 5 |
| Amount (pts. mass) | Sodium stearate | 2.5 | 1.5 | 2 | 2 | 0 | 0 | 0 | 5 | 1 |
|  | Ethylene glycol | 45.5 | 46.5 | 46 | 0 | 48 | 58 | 80 | 45.5 | 47 |
|  | Corrosion inhibitor | 2 | 2 | 2 | 2 | 2 | 2 | 2 | 2 | 2 |
|  | Water | 50 | 50 | 50 | 92 | 50 | 40 | 18 | 47.5 | 50 |
| Viscosity properties | Kinematic viscosity (mm$^2$/s) 25° C. | 20 | 10 | 14 | 10 | 3 | 6 | 8.5 | ※ | 4 |
|  | 100° C. | 0.8 | 0.8 | 0.8 | 0.4 | 0.8 | 0.9 | 1.4 | 0.8 | 0.8 |
| Thermal properties | Warming properties (sec) | 22 | 30 | 25 | 30 | 60 | 50 | 40 | — | 60 |
|  | Cooling properties (kw) | 14.4 | 14.3 | 14.3 | 15.6 | 14.7 | 14.2 | 13.3 | — | 14.3 |

* Unmeasurable due to gel formation

As is apparent from Table 1, the temperature increased more rapidly with the use of the coolant compositions of Examples 1 to 4 than with the use of the conventional coolant composition of Comparative Example 3, which has enhanced 8. The composition according to claim 7, which comprises, as a base, at least one type of alcohol selected from the group consisting of dihydric alcohol, trihydric alcohol, and glycol monoalkyl ether and/or water.

9. The composition according to claim 8, which comprises an agent for improving viscosity characteristics.

10. The composition according to claim 9, wherein the agent for improving viscosity characteristics is a phase-change material.

11. The composition according to claim 7, which comprises an agent for improving viscosity characteristics.

12. The composition according to claim 11, wherein the agent for improving viscosity characteristics is a phase-change material.

* * * * *